United States Patent [19]
Choi

[11] Patent Number: 5,905,254
[45] Date of Patent: May 18, 1999

[54] COMPACT SIZED OPTICAL PICKUP SYSTEM

[75] Inventor: Yang-Oh Choi, Seoul, Rep. of Korea

[73] Assignee: Daewoo Electronics Co., Ltd., Seoul, Rep. of Korea

[21] Appl. No.: 08/940,890

[22] Filed: Sep. 30, 1997

[30] Foreign Application Priority Data

| Sep. 30, 1996 | [KR] | Rep. of Korea | 96-43086 |
| Sep. 30, 1996 | [KR] | Rep. of Korea | 96-43087 |
| Sep. 30, 1996 | [KR] | Rep. of Korea | 96-43093 |
| Sep. 30, 1996 | [KR] | Rep. of Korea | 96-43094 |

[51] Int. Cl.$^6$ .................................................. G11B 7/00
[52] U.S. Cl. .................. 250/201.5; 250/225; 369/44.23; 369/112
[58] Field of Search ................................ 250/201.5, 225; 369/44.14, 44.23, 44.24, 44.37, 110, 112

[56] References Cited

U.S. PATENT DOCUMENTS

| 4,817,072 | 3/1989 | Toide et al. . | |
| 5,331,622 | 7/1994 | Ernst et al. . | |
| 5,550,368 | 8/1996 | Park ....................................... | 250/201.5 |
| 5,657,164 | 8/1997 | Shuman .................................. | 369/112 |

FOREIGN PATENT DOCUMENTS

| 0749119 | 12/1996 | European Pat. Off. . |
| 63-269325 | 11/1988 | Japan . |
| 2256725 | 12/1992 | United Kingdom . |

*Primary Examiner*—Edward P. Westin
*Assistant Examiner*—Kevin Pyo
*Attorney, Agent, or Firm*—Anderson, Kill & Olick, P.C.

[57] ABSTRACT

An optical pickup system reads an information signal from stored on a recording surface of an optical disk. The optical pickup system includes a light source for generating a light beam including a P and an S polarization component with a wavelength $\lambda_1$, a ¼λ plate for changing the polarization component of the light beam transmitted therethrough, an optical detector for detecting the information signal off the optical disk, and a beam splitter, provided with a first and a second surface, the first surface being capable of reflecting one of the polarization components to the optical disk through the ¼λ plate and transmitting the light beam reflected from the optical disk changed its polarization component by passing through the ¼λ plate to the second surface being capable of reflecting the light beam impinging thereon to the detecting means, thereby allowing the optical pickup system to read the information signals off the recording surface.

10 Claims, 3 Drawing Sheets

COMPACT SIZED OPTICAL PICKUP SYSTEM

FIELD OF THE INVENTION

The present invention relates to an optical pickup system; and, more particularly, to an optical pickup system with a size reduced by incorporating therein an integrated beam splitter.

DESCRIPTION OF THE PRIOR ART

One of the common problems in an optical information recording disk, e.g., laser disk, is related with the occurrence of focusing errors and there has been introduced an astigmatic method to solve the problem.

In FIG. 1, there is illustrated a prior art optical pickup system 100 utilizing the astigmatic method, as disclosed in U.S. Pat. No 4,023,033, entitled "Optical Focusing Device" and is incorporated herein by reference. The optical pickup system 100 comprises a light source 110, a beam splitter 120, an objective lens 130, an optical information recording disk 140(hereinafter, referred to as an optical disk), a cylindrical lens 150 and an optical detector 160. In the system 100, a light beam 112 emitted from the light source 110, e.g., a laser diode, falls on the beam splitter 120 and is partially reflected by a reflection surface 122 incorporated therein. The light beam reflected from the reflection surface 122 is focused through the objective lens 130 on a recording surface 144 of the optical disk 140 as a focused light beam. The focused light beam reflected from the optical disk 140 is converged by the objective lens 130 and partially transmitted through the beam splitter 120, made astigmatic by its passage through the cylindrical lens 150 and thereafter impinges onto a light-reception surface 162 of the optical detector 160, wherein the light-reception surface 162 is divided into four square photoelectric cells(not shown) arranged to form a square. Each of the photoelectric cells generates an output in the form of a light intensity measurement. Two outputs from two photoelectric cells located diagonally opposite from each other in the square light-reception surface are sent to a first adder and those from the other two photoelectric cells are sent to a second adder, respectively. Results from the first and the second adders are then sent to a differential amplifier(not shown) which will in turn generate an associated focusing error by comparing the two outputs from the first and the second adders, the focusing error simply being a difference between the two outputs from the pair of adders.

Being astigmatic, the image shape of the luminous flux on the light-reception surface 162 of the optical detector 160 changes depending on the relative position of the recording surface 144 of the optical disk 140 with respect to a convergence point 142 of the light beam. In order to detect the change in the image shape of the luminous flux, the cylindrical lens 150 is positioned between the convergence point 142 and the optical detector 160 in such a way that the image shape of the luminous flux on the light-reception surface 162 becomes circular when the light beam is exactly focused(zero focusing error) on the recording surface 144 and this is known as a "just focused" position in the art. If the optical disk 140 is moved along an optical axis drawn between the just focused position and the center of the objective lens 130, the focusing error signal becomes non-zero with a sign indicating the direction of the displacement of the recording surface 144 of the optical disk 140 from the "just focused" position, thereby detecting the focusing error.

One of the major shortcomings of the above-described optical pickup system 100 is a large size thereof due to the use of the cylindrical lens 150 which is located between the optical detector 160 and the beam splitter 120, thereby extending the overall optical path of the optical pickup system 100, which in turn, makes the overall size of the optical pickup system 100 bulky.

Further, this conventional astigmatic method requires a cylindrical lens 150 to focus a beam spot in an astigmatic manner. Moreover, since the conventional cylindrical lens 150 employed therein is not planar, it is difficult to align the cylindrical lens 150 accurately with the convergence point 142 and the center of the light-reception surface 162 of the optical detector 160 in such a manner that the center of the light-reception surface 162 coincides with the center of the circular shape of the luminous flux image when the light beam is "just focused" on the recording surface 144 of the optical disk 140.

SUMMARY OF THE INVENTION

It is, therefore, a primary object of the present invention to provide an optical pickup system having a reduced size with a simpler structure.

In accordance with one aspect of the present invention, there is provided an optical pickup system for reading information signals stored on an optical disk having a recording surface, said system comprising: a light source for generating a light beam including a P and an S polarization component; a ¼λ plate for changing the polarization component of the light beam transmitted therethrough; a detector for detecting the information signal off the optical disk; and a beam splitter, provided with a first and a second surface, the first surface being capable of reflecting one of the polarization components to the optical disk through the ¼λ plate and transmitting the light beam reflected from the optical disk changed its polarization component by passing through the ¼λ plate to the second surface being capable of reflecting the light beam impinging thereon to the detector, thereby allowing the optical pickup system to read the information signals off the recording surface.

In accordance with another aspect of the present invention, there is provided an optical pickup system capable of reading information signals stored on an optical disk having a recording surface by using a knife edge, said system comprising: a light source for generating a light beam including a P and an S polarization component; a ¼λ plate for changing the polarization component of the light beam transmitted therethrough; a detector for detecting the information signal off the optical disk; and a beam splitter, provided with a first and a second surface, the first surface being capable of reflecting one of the polarization components to the optical disk through the ¼λ plate and transmitting the light beam reflected from the optical disk changed the polarization component of the light beam by passing through the ¼λ plate to the second surface being capable of reflecting a portion of the changed polarization light beam impinging thereon to the detector, thereby allowing the second surface to serve as the knife edge.

BRIEF DESCRIPTION OF THE DRAWINGS

The present invention together with the above and other objects and advantages will become apparent from the following description of preferred embodiments, when read in conjunction with the accompanying drawings, wherein.

DETAILED DESCRIPTION OF THE PREFERRED EMBODIMENTS

Figure 1:
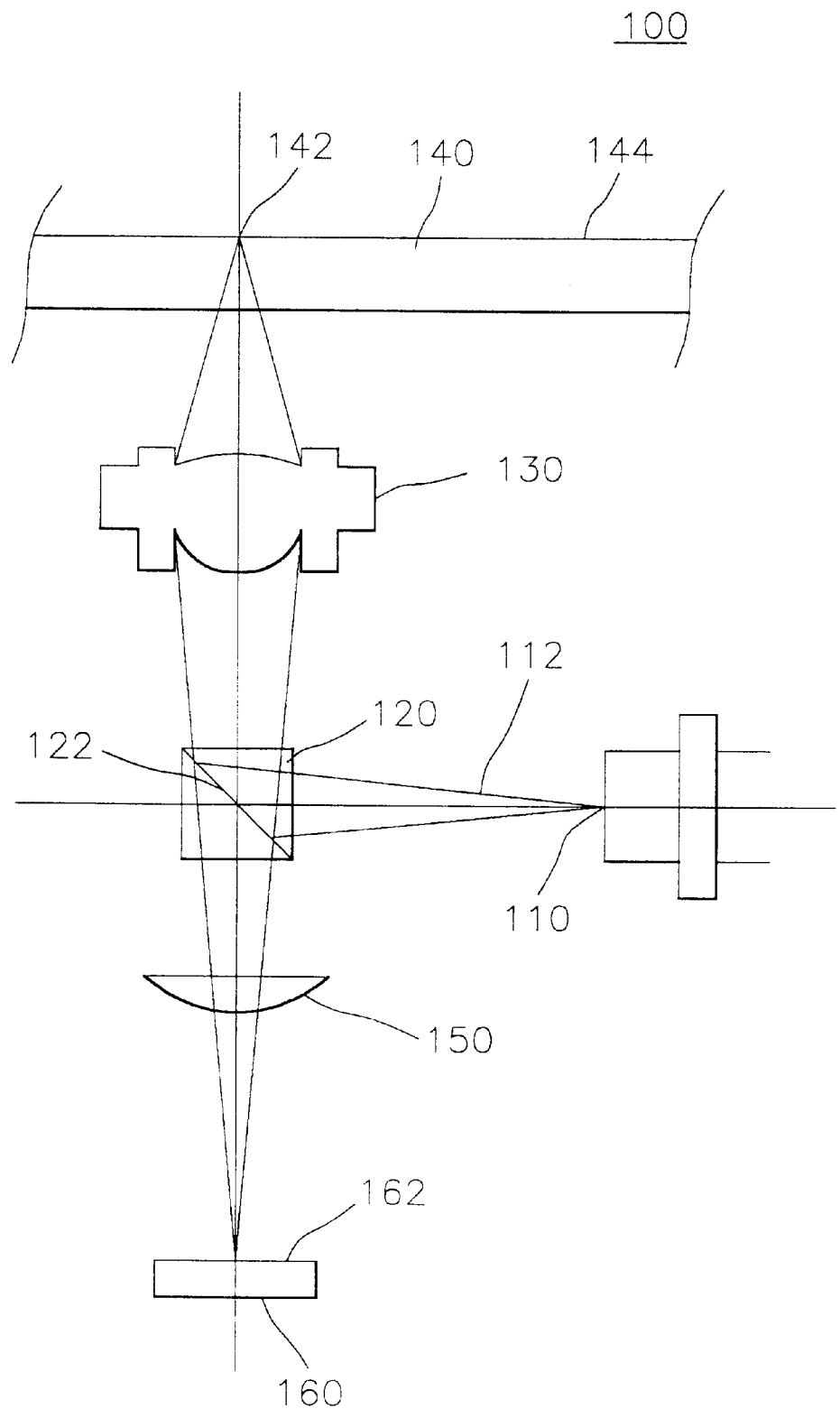
FIG. 1 represents a schematic side view of a prior art optical head.
Figure 2:
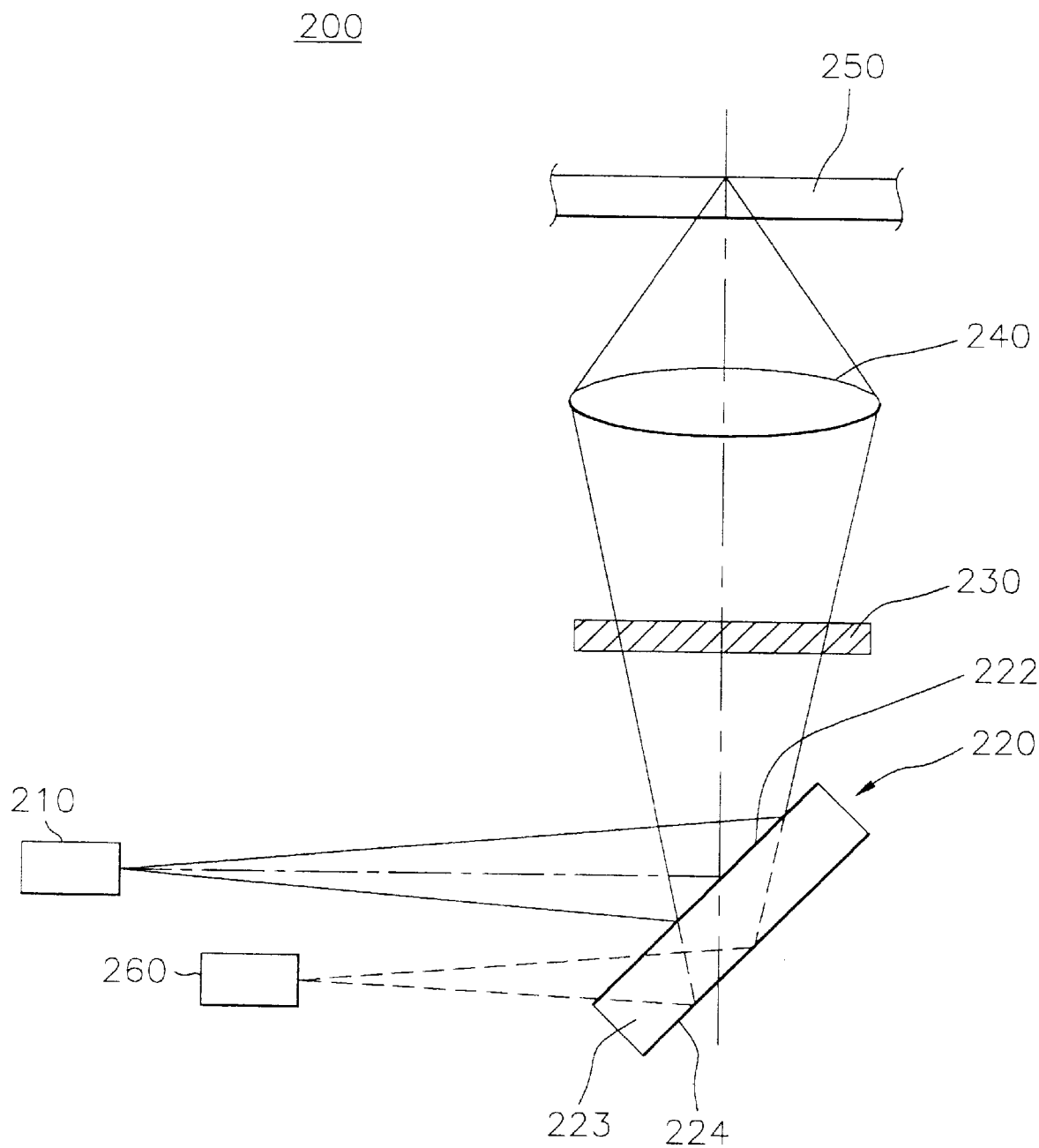
FIG. 2 exhibits a schematic side view of an optical pickup system utilizing an inventive beam splitter in accordance with a first preferred embodiment of the present invention.
Figure 3:
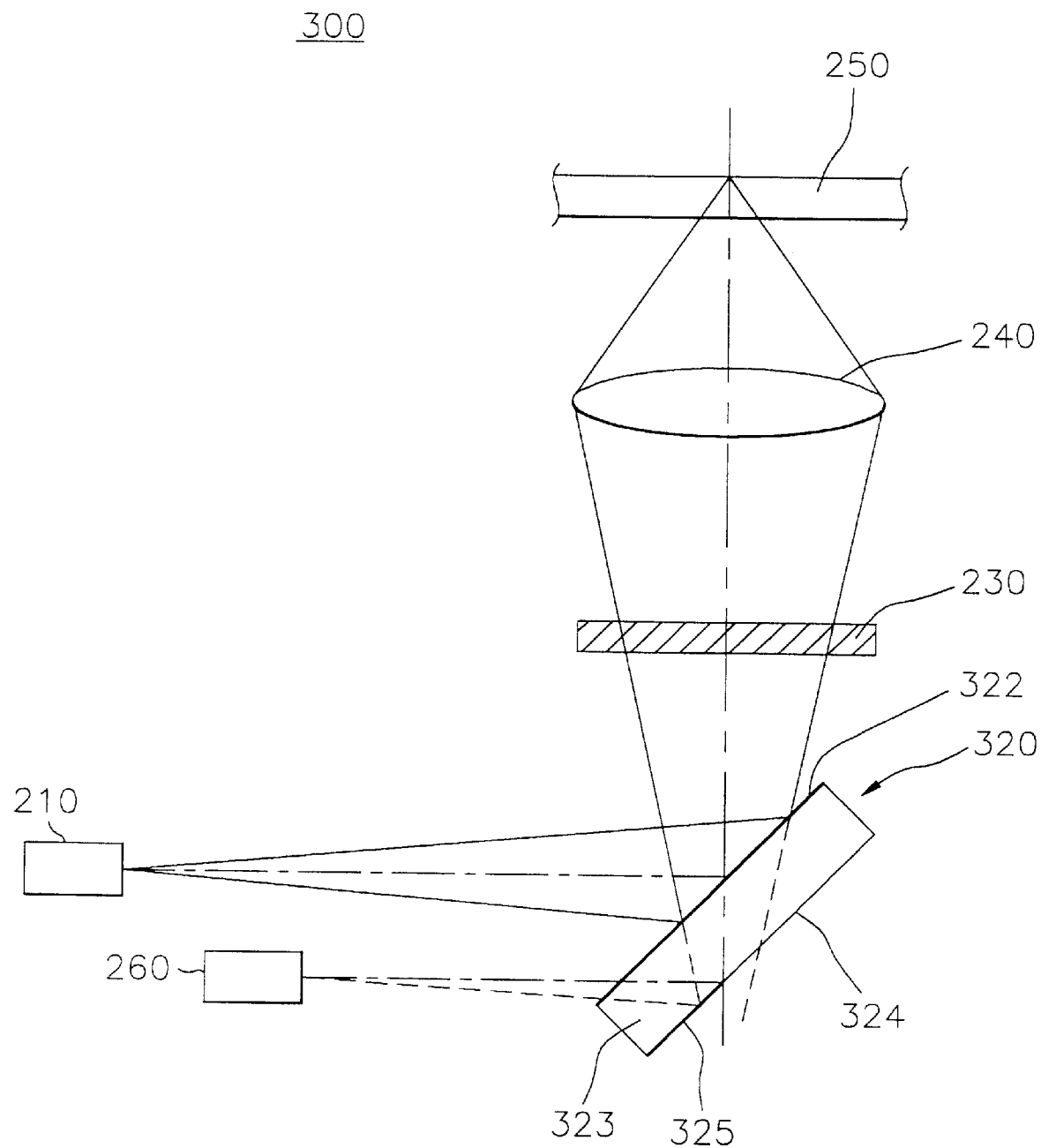
FIG. 3 represents a schematic side view of an optical pickup system utilizing an inventive beam splitter in accordance with a second preferred embodiment of the present invention.

There are illustrated in FIGS. 2 and 3 schematic side views of optical pickup systems 200 and 300 in accordance with a first and a second preferred embodiment of the present invention, respectively. It should be noted that like parts appearing in FIGS. 2 and 3 are represented by like reference numerals.

In FIG. 2, there is illustrated a schematic side view of the inventive optical pickup system 200 in accordance with a first embodiment of the present invention comprising a light source 210, e.g., a semiconductor laser or a laser diode, for generating a light beam including a P and an S-polarized light component with a wavelength $\lambda_1$, a ¼$\lambda$ plate 230, an objective lens 240, an optical detector 260 and a beam splitter 220 provided with a base 223 transparent to the light beam, a first and a second surface 222, 224, wherein the beam splitter 220 may be produced, e.g., by depositing on the first surface 222 a first material which is capable of reflecting the P-polarized light component impinging thereon and transmitting the S-polarized light component, and by coating on the second surface 224 a second material which is capable of reflecting the light beam impinging thereon. The objective lens 240, the ¼$\lambda$ plate 230 and the beam splitter 220 are so arranged that the ¼$\lambda$ plate 230 is disposed between the objective lens 240 and the beam splitter 220, and an optical axis connecting a focal point of the objective lens 240 and the center of the objective lens 240 passes through the center of the ¼$\lambda$ plate 230 and also meets the first and the second surface 222, 224 of the beam splitter 220 at a predetermined angle, preferably the predetermined angle being 45 degrees. The light source 210 is placed at a position such that a light beam therefrom converged by the objective lens 240 after first being reflected from the first surface 222 and then transmitted through the ¼$\lambda$ plate 230 will be focused at a point along the optical axis, wherein the light beam is aligned along a first line connecting the light source 210 with a first intersection point of the optical axis with the first surface 222 of the beam splitter 220. The first line is perpendicular to the optical axis when the predetermined angle is 45 degrees.

When a light beam emanating from the light source 210 falls on the beam splitter 220, the first surface 222 of the beam splitter 220 transmits the S-polarized light component and reflects the P-polarized light component. The P-polarized light beam reflected from the first surface 222 is transmitted through the ¼$\lambda$ plate 230 and then is focused on the recording surface of the optical disk 250 by the objective lens 240. Thereafter, the P-polarized light beam reflected from the recording surface of the optical disk 250 is first converged by the objective lens 240, is then transmitted through the ¼$\lambda$ plate 230, thereby converting the P-polarized light beam into an S-polarized light beam. The S-polarized light beam converted from the P-polarized light beam is transmitted through the first surface 222 of the beam splitter 220 falls on the second surface 224 thereof. The S-polarized light beam is then reflected from the second surface 224 of the beam splitter 220 to the optical detector 260 after being transmitted through the first surface 222, wherein the S-polarized light beam converted from the P-polarized light beam is represented by dotted lines in FIG. 2. Since the light beam incident onto the beam splitter 220 is non-parallel light beam and the beam splitter 220 is inclined with respect to the optical axis, the base 223 of the beam splitter 220 can be made thick enough to generate an astigmatic aberration for the light beam, thereby converting the S-polarized light beam into an astigmatic light beam, and thus enabling for the optical detector 260 to detect a focusing error signal.

The optical detector 260 is located at a focusing point of the converted S-polarized light beam reflected from the second surface of the beam splitter 220 and is placed on a second line connecting the center of the detector 260 and a second intersecting point of the optical axis with the second surface 224 of the beam splitter 220, wherein the second line is perpendicular to the optical axis when the predetermined angle is 45 degrees. The optical path of the converted S-polarized light beam from the optical detector 260 to the first intersection point becomes equal to the optical path from the light source 210 to the first intersection point. The optical detector 260 is capable of measuring the intensity of a light beam detected thereon. The astigmatic light beam, reflected from the second surface 224 of the beam splitter 220, falls onto the optical detector 260, thereby allowing the optical pickup system 200 to reproduce the information signal off the recording surface of the optical disk 250.

In comparison with the prior art optical pickup system 100, the inventive optical pickup system 200 has a simpler alignment process and a simpler structure. This is achieved by incorporating therein the beam splitter 220 having enough thickness to generate an astigmatic aberration and the first and the second surface 222, 224 thereof, wherein the first surface 222 of the beam splitter 220 is formed by coating a first material which is capable of reflecting the P-polarized light component impinging thereon and transmitting the S-polarized light component therethrough, and the second surface 224 of the beam splitter 220 is produced by coating a second material which is capable of reflecting the light beam impinging thereon, thereby eliminating the cylindrical lens 150 in the prior art optical pickup system 100, thereby reducing the overall optical path of the optical pickup system 200. Further, since the first and the second surface 222, 224 are integrated into the beam splitter 220, the alignment of the inventive optical pickup system 200 is much easier than that of the prior art optical pickup system 100.

Alternatively, in FIG. 3, there is shown a schematic side view of an optical pickup system 300 incorporated an inventive beam splitter 320 therein in accordance with a second preferred embodiment of the present invention. The inventive beam splitter 320 is similar to that of the first preferred embodiment shown in FIG. 2 except that a part 325 of the second surface 324 is coated with a material capable of reflecting the S-polarization component of the light beam and a remaining part is coated with a material capable of transmitting the S-polarization component of the light beam, wherein the second surface 324 is partitioned into two by a line passing through an intersecting point between the optical axis and the second surface 324, and the part 325 being a part of the second surface 324 below the intersecting point. An upper edge of the part 325 of the second surface 324 serves as a knife edge, thereby allowing the optical pickup system 300 to reproduce the information signal off the recording surface of the optical disk 250.

In comparison with the first embodiment of the present invention, the second embodiment is capable of reducing the thickness of the beam splitter 320. This is achieved by utilizing the upper edge of the part 325 of the second surface 324 as a knife edge. Therefore, the beam splitter 320 is not required to be thick enough to generate an astigmatic aberration.

In the first embodiment in accordance with the present invention described for an optical pick system 200 including the beam splitter 220 capable of generating an astigmatic aberration, if the beam splitter 220 is not thick enough to generate the astigmatic aberration, an optical device, e.g., a Fresnel lens can be formed on a portion of the second surface 224 of the beam splitter 220, the Fresnel lens being capable of making a light beam passing therethrough astigmatic, wherein the portion is placed at a position on which the light beam reflected from the optical disk impinges.

While the present invention has been described with respect to the preferred embodiments, other modifications and variations may be made without departing from the spirit and scope of the present invention as set forth in the following claims.

What is claimed is:

1. An optical pickup system for reading information signals stored on an optical disk having a recording surface, said system comprising:

means for generating a light beam including a P polarization component and an S-polarization component;

a ¼λ plate for changing the polarization component of the light beam transmitted therethrough;

means for detecting the information signal off the recording surface of the optical disk; and optical means, provided with a first surface and a second surface, the first surface for reflecting one of the polarization components to the optical disk through the ¼λ plate and transmitting the other component and for transmitting the light beam reflected from the optical disk whose polarization component has been converted to the other polarization component by passing through the ¼λ plate back and forth to the second surface which reflects the light beam impinging thereon to the detecting means, wherein the second surface is formed by being coated with a material capable of reflecting the light incident thereon and wherein only a portion of the second surface on which the light beam reflected from the optical disk impinges is coated with the material to reflect the light beam incident thereon, letting light beams falling on the remaining portion thereof being transmitted to outside of the optical pickup system so as to reduce noises, thereby allowing the optical pickup system to read the information signals off the recording surface.

2. The optical pickup system of claim 1, further comprising an objective lens for focusing the light beam to the recording surface of the optical disk, and converging the light beam reflected from the recording surface on the detecting means.

3. The optical pickup system of claim 2, wherein the ¼λ plate is disposed between the optical means and the objective lens.

4. The optical pickup system of claim 3, wherein the objective lens is disposed between the ¼λ plate and the optical disk.

5. The optical pickup system of claim 2, wherein the first surface of the optical means is arranged in such a way that it is inclined at a predetermined angle with respect to an optical axis formed by connecting a central point of the objective lens and a focal point of the objective lens.

6. The optical pickup system of claim 5, wherein the predetermined angle is 45 degrees.

7. The optical pickup system of claim 5, wherein the second surface is separated from the first surface at a predetermined distance, thereby making the light beam transmitted through the optical means astigmatic.

8. The optical pickup system of claim 5, wherein the generating means is placed at a position such that the light beam therefrom is focused by the objective lens at a point along the optical axis, wherein the light beam is aligned along a first line connecting the generating means with an intersecting point of the optical axis with the first surface of the optical means.

9. The optical pickup system of claim 8, wherein the detecting means is placed at a focusing point of the light beam reflected from the second surface of the optical means, the light beam being focused by the objective lens after being reflected from the optical disk, and is perpendicularly aligned with respect to a second line connecting the center of the detecting means and an intersecting point of the optical axis with the second surface of the optical means.

10. An optical pickup system for reading information signals stored on an optical disk having a recording surface by using a knife edge, said system comprising:

means for generating a light beam including a P and an S-polarization component;

a ¼λ plate for changing the polarization component of the light beam transmitted therethrough;

means for detecting the information signal off the optical disk;

optical means, provided with a first and a second surface, the first surface for reflecting one of the polarization components to the optical disk through the ¼λ plate and transmitting the other component and for transmitting the light beam reflected from the optical disk whose polarization component has been changed to the other polarization component of the light beam by passing through the ¼λ plate back and forth to the second surface which reflects a portion of the changed polarization light beam impinging thereon to the detecting means, the second surface including a part which is selected from parts of the second surface partitioned into two by a line passing through the intersecting point between an optical axis and the second surface, the optical axis being formed by connecting a central point of the objective lens and a focal point thereof, thereby allowing the second surface to serve as the knife edge; and objective lens for focusing the light beam to the recording surface of the optical disk, and converging the light beam reflected from the recording surface on the detecting means.

\* \* \* \* \*